(12) United States Patent
Takehara et al.

(10) Patent No.: US 7,965,976 B2
(45) Date of Patent: Jun. 21, 2011

(54) INFORMATION PROCESSING APPARATUS AND METHOD AND COMPUTER PROGRAM

(75) Inventors: Mitsuru Takehara, Tokyo (JP);
Masashi Iwabuchi, Kanagawa (JP);
Tomohiko Shirahama, Tokyo (JP);
Takao Shimada, Tokyo (JP)

(73) Assignees: Sony Corporation, Tokyo (JP); Sony Ericsson Mobile Communications Japan, Inc., Tokyo (JP)

( * ) Notice: Subject to any disclaimer, the term of this patent is extended or adjusted under 35 U.S.C. 154(b) by 1039 days.

(21) Appl. No.: 11/354,680

(22) Filed: Feb. 15, 2006

(65) Prior Publication Data

US 2006/0195867 A1    Aug. 31, 2006

(30) Foreign Application Priority Data

Feb. 16, 2005 (JP) ................................. 2005-039705

(51) Int. Cl.
*H04H 60/09* (2008.01)
*H04B 1/18* (2006.01)
(52) U.S. Cl. ..................................... 455/3.04; 455/186.1
(58) Field of Classification Search .................. 455/3.01, 455/3.02, 3.03, 3.04, 179.1, 185.1, 186.1; 725/46, 58
See application file for complete search history.

(56) References Cited

U.S. PATENT DOCUMENTS

| | | | |
|---|---|---|---|
| 6,859,845 B2 * | 2/2005 | Mate | 710/5 |
| 7,451,450 B2 * | 11/2008 | Sankaranarayan et al. | 718/104 |
| 2001/0021995 A1 * | 9/2001 | Hatano | 725/50 |
| 2009/0310937 A1 * | 12/2009 | Ellis et al. | 386/83 |

FOREIGN PATENT DOCUMENTS

| | | |
|---|---|---|
| JP | 2002 16889 | 1/2002 |
| JP | 2002 369090 | 12/2002 |

* cited by examiner

*Primary Examiner* — Nguyen Vo
(74) *Attorney, Agent, or Firm* — Frommer Lawrence & Haug LLP; William S. Frommer; Thomas F. Presson

(57) ABSTRACT

If a situation in which it is difficult to make a decision about automatic processing without involving user intervention occurs, an inquiry is made to a user to clear such a situation and a response by the user to the inquiry is used as a decision criterion by which to decide the execution of automatic processing when a similar situation occurs later. If a change occurs in the broadcast time of a broadcast program set for timer-recording, this broadcast program overlaps, in broadcast time, another broadcast program set for timer-recording. However, if a need occurs for recording broadcast programs in excess of the number of broadcast programs that may be simultaneously recorded, an inquiry is made to the user which of these broadcast programs is to be preferentially recorded. A response by the user to this inquiry is also used as a criteria for selecting a broadcast program to be preferentially recorded if a similar situation occurs later. The present invention is applicable to devices having capabilities of recording broadcast programs without user intervention.

5 Claims, 8 Drawing Sheets

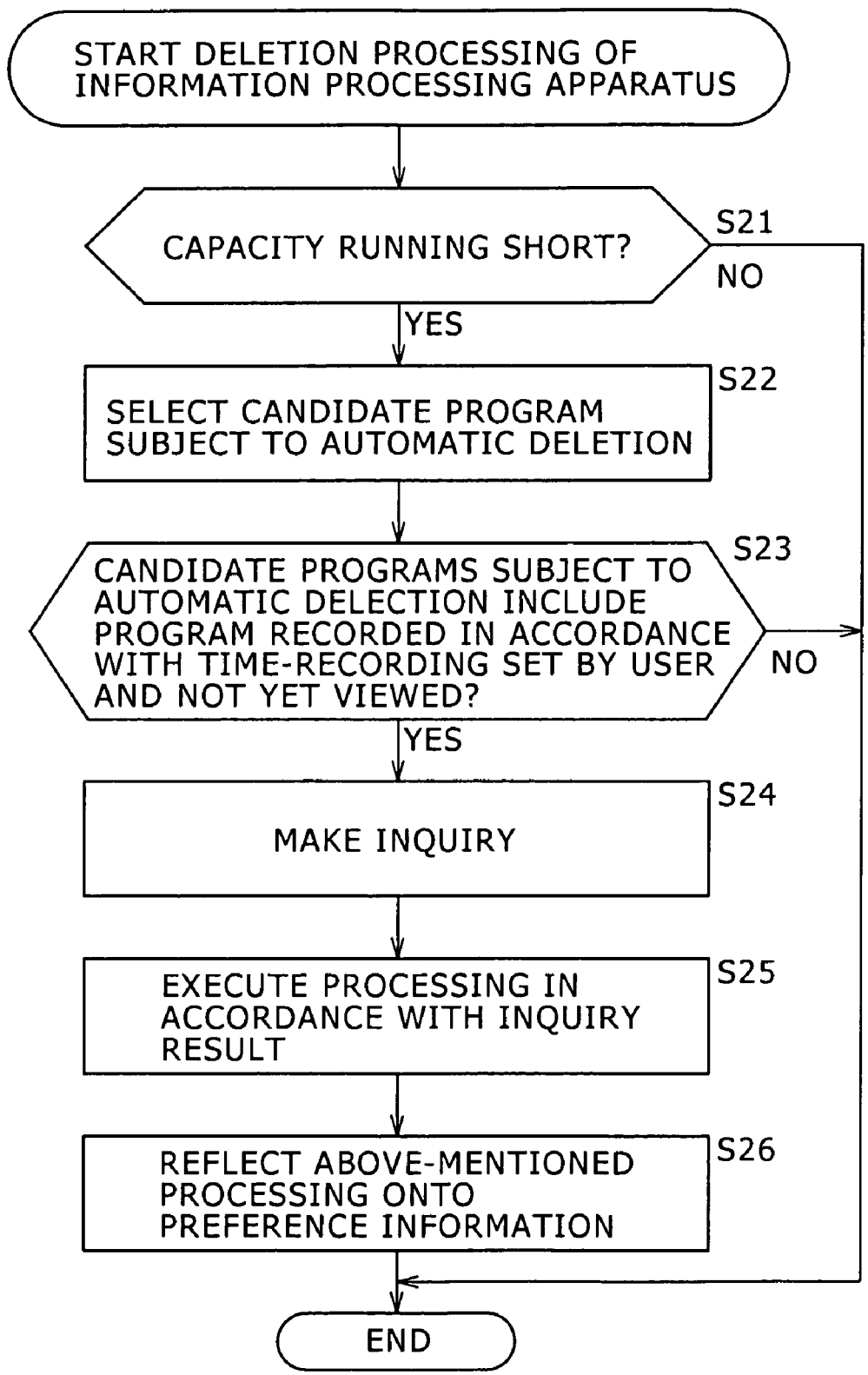

INFORMATION PROCESSING APPARATUS AND METHOD AND COMPUTER PROGRAM

CROSS REFERENCES TO RELATED APPLICATIONS

The present invention contains subject matter related to Japanese Patent Application JP 2005-039705 filed in the Japanese Patent Office on Feb. 16, 2005, the entire contents of which being incorporated herein by reference.

BACKGROUND OF THE INVENTION

The present invention relates to an information processing apparatus and method and a computer program and, more particularly, to an information processing apparatus and method and a computer program that, if a decision for processing to be automatically executed without intervention by a user becomes difficult to make, are adapted to make inquiries to clear such a difficult status and, when a similar status occurs next, use an inquiry result as a decision criterion.

Recently, recording/reproducing apparatuses adapted to automatically record broadcast programs on the basis of user preferences for example and automatically delete those recorded broadcast programs which have been left unreproduced for a certain period of time have been put on the market and gaining popularity.

For technologies applicable to these apparatuses, technologies for managing the setting of timer-recording and managing recorded programs have been proposed. For example, Patent Document 1 (Japanese Patent Laid-open No. 2002-16889) discloses a technology in which, if the organization of a broadcast program has been altered to make broadcast time zones of two or more programs set for timer-recording overlap, the user is notified of the occurrence of such a situation by means of user's personal computer or user's mobile phone via a network.

In addition, Patent Document 2 (Japanese Patent Laid-open No. 2002-100158) discloses a technology in which, if there is any content recorded by not yet reproduced, the user is notified of the existence of such content. This Patent Document 2 also discloses a technology in which, if a particular piece of content not yet reproduced has been selected as a candidate for the content to be deleted so as to allocate a free space to a recording medium, the user is notified thereof for confirmation.

Patent Document 3 (Japanese Patent Laid-open No. 2003-69927) discloses a technology in which, the information about the timer-recording set on a plurality of devices is managed by a single server and, if the programs set for timer-recording include any of which broadcast time zones overlap, an electronic mail message is sent to the device by which that setting has been made, thereby solving the time zone overlap.

(Problem 1)

With the above-mentioned recording/reproducing apparatuses, the signal of a broadcast program to be recorded is extracted from a broadcast wave by a built-in tuner. Therefore, if there is one built-in tuner, one broadcast program may be recorded, if there is two built-in tuners, two broadcast programs may be recorded, and so on, so that the number of broadcast programs that may be simultaneously recorded is limited by the number of built-in tuners.

If two tuners are built in for example, one or two broadcast programs may be recorded at the same time and three or more broadcast programs cannot be recorded at the same time, so that, when two broadcast programs to be broadcast in a same time zone have already been set for timer-recording, an attempt to additionally timer-record a third broadcast program in the same tine zone results in an error. Therefore, the user cannot set the recording/reproducing apparatus for timer-recording the third broadcast program.

On the other hand, broadcast time zones may be changed by broadcast stations, possibly resulting in a situation in which broadcast programs exceeding the number of channels must be recorded at the same time. This example is shown in FIG. 1. It is supposed in this example that two tuners be incorporated in the recording/reproducing apparatus.

In the example shown in FIG. 1, it is supposed that the timer-recording of drama 1 to be broadcast in a broadcast time zone from 21:00 to 22:00 (the original broadcast time zone) be set and the timer-recording of dramas 2 and 3 to be broadcast in a time zone from 22:00 to 23:00 be set. In a time zone from 21:00 to 22:00, there is only one drama 1 set for timer-recording. In a time zone from 22:00 to 23:00, there are only two dramas 2 and 3 set for timer-recording. Therefore, the recording/reproducing apparatus having two tuners may record all of these three programs.

If a baseball live broadcast being broadcast immediately before drama 1 is extended by 30 minutes as shown with white arrow A1, then drama 1 to be broadcast after the baseball live broadest is accordingly postponed by 30 minutes as shown with white arrow A2, resulting in a situation in which there are three broadcast programs to be recorded in a time zone from 22:00 to 22:30.

If such a situation is encountered, the recording/reproducing apparatus conventionally automatically cancel the recording of any one of the three broadcast programs, which may contract the user's intention.

This problem may be overcome by notifying the user of the situation and canceling the setting for timer-recording in accordance with the user's response; however, according to the technology disclosed in patent document 1, the response by the user to the notification (namely, the user selection) is not used in a next similar situation and therefore it is necessary to make a notification again by electronic mail for example if a similar situation occurs next.

(Problem 2)

As described above, some recording/reproducing apparatuses have capabilities of automatically recording programs selected by the user on the basis of user preference information. In such recording/reproducing apparatuses, learning is executed so that, if an automatically recorded broadcast program is deleted without being reproduced for viewing by the user for example, it is determined that such a program is not liked by the user, thereby lowering the recording priority for example to prevent a same or like broadcast program from being automatically recorded later.

Consequently, a condition that a particular broadcast program be automatically recorded and a condition that this broadcast program be not automatically recorded may be set at the same time. This example shown in FIG. 2.

In the example shown in FIG. 2, the user has once deleted an automatically recorded talk program "The Room of T" (a broadcast program titled "The Room of T") without reproducing for viewing. It is assumed from this fact that talk program "The Room of T" be regarded as a program that be not automatically recorded (condition A). At the same time, the user has often viewed programs in which popular idol K performed. It is assumed from this fact that every program in which popular idol K performs be automatically recorded (condition B).

If an EPG (Electronic Program Guide) indicates that popular idol K performs in talk program "The Room of T" for example, this program satisfies both condition A and condition B indicated by white arrow, thereby making it impossible for the recording/reproducing apparatus to determine whether to record this program or not.

If such a situation happens, a general conventional practice is that such determination is left to the discretion of the recording/reproducing apparatus itself. However, the determination by the recording/reproducing apparatus may contradict the user intention, so that, in order to prevent such a situation from happening, the user may be notified thereof as disclosed in Patent Document 1. Since the technology disclosed in Patent Document 1 will not use each notification once made in a next similar situation again, the user must be notified of the situation again by electronic mail for example. (Problem 3)

As described above, the recording/reproducing apparatus has capabilities of automatically deleting programs considered unnecessary for the user from the HDD (Hard Disk Drive) providing program data recording medium when the HDD is running short.

Normally, broadcast programs to be deleted are old programs for which a certain period of time has passed since the recording. However, if these programs have not yet been reproduced for viewing, it is difficult for the recording/reproducing apparatus to determine whether to delete or not. This situation is especially conspicuous if these programs were recorded by the user himself by setting timer-recording (namely, these programs were not automatically recorded).

As described above, Patent Document 2 for example disclosed a technology for notifying the user of a situation in which it is difficult for the recording/reproducing apparatus to determine whether or not to delete broadcast programs unnecessary for the user. However, even this disclosed technology is not adapted to reflect a result of the notification onto user preference for example to support the determination in later similar situations.

SUMMARY OF THE INVENTION

Therefore, present invention addresses the above-identified and other problems associated with related-art methods and apparatuses by providing an information processing apparatus and method and a computer program that are capable of, if it becomes difficult to make a decision by automatic processing without user intervention, clears this difficult situation by making an inquiry to the user and reflecting a result of the inquiry onto the decision to be made later in similar situations.

In carrying out the invention and according to one embodiment thereof, there is provided a first information processing apparatus having an inquiry block for, if, due to a change in a transmission time of a program to be recorded, transmission times of programs exceeding the number of programs that can be simultaneously recorded overlap, inquiring a user which of the programs overlapping in transmission time is to be recorded; a selection block for selecting a program on the basis of a response by the user to the inquiry; and a reflection means for reflecting a selection result obtained by the selection block as a criterion by which to record a program if a similar overlapping status occurs later.

In the above-mentioned first information processing apparatus, the inquiry block makes an inquiry to the user which program is to be recorded, by use of one of methods of displaying the inquiry on a display monitor and transmitting the inquiry by electronic mail.

In the above-mentioned first information processing apparatus, the inquiry block selects one of the methods of displaying the inquiry on a display monitor and transmitting the inquiry by electronic mail in accordance with a degree of emergency for clearing the status in which transmission times of programs exceeding the number of programs that may be simultaneously recorded.

In carrying out the invention and according to another embodiment thereof, there is provided a first information processing method having the steps of, if, due to a change in a transmission time of a program to be recorded, transmission times of programs exceeding the number of programs that can be simultaneously recorded overlap, inquiring a user which of the programs overlapping in transmission time is to be recorded; selecting a program on the basis of a response by the user to the inquiry; and reflecting a selection result obtained by the selection step as a criterion by which to record a program if a similar status occurs later.

In carrying out the invention and according to still another embodiment thereof, there is provided a first computer program having the steps of, if, due to a change in a transmission time of a program to be recorded, transmission times of programs exceeding the number of programs that can be simultaneously recorded overlap, inquiring a user which of the programs overlapping in transmission time is to be recorded; selecting a program on the basis of a response by the user to the inquiry; and reflecting a selection result obtained by the selection step as a criterion by which to record a program if a similar status occurs later.

In carrying out the invention and according to yet another embodiment thereof, there is provided a second information processing apparatus having an inquiry block for making an inquiry to a user whether to record a program if a situation occurs in which the program becomes subject to recording if one of conditions providing criteria for selecting programs to be recorded is referenced, but does not become subject to recording if another of the conditions is referenced; a selection block for selecting a program on the basis of a response by the user to the inquiry; and a reflection block for reflecting a selection result obtained by the selection block as a criterion by which to record a program if a similar overlapping status occurs later.

In the above-mentioned second information processing apparatus, the inquiry block makes an inquiry to the user which program is to be recorded, by use of one of methods of displaying the inquiry on a display monitor and transmitting the inquiry by electronic mail.

In the above-mentioned second information processing apparatus, the inquiry block selects one of the methods of displaying the inquiry on a display monitor and transmitting the inquiry by electronic mail in accordance with a degree of emergency for clearing the status in which the program becomes subject to recording if one of conditions providing criteria for selecting programs to be recorded is referenced, but does not become subject to recording if another of the conditions is referenced.

In carrying out the invention and according to a different embodiment thereof, there is provided a second information processing method having the steps of making an inquiry to a user whether to record a program if a situation occurs in which the program becomes subject to recording if one of conditions providing criteria for selecting programs to be recorded is referenced, but does not become subject to recording if another of the conditions is referenced; selecting a program on the basis of a response by the user to the inquiry; and reflecting a selection result obtained by the selection step as a criterion by which to record a program if a similar overlapping status occurs later.

In carrying out the invention and according to a still different embodiment thereof, there is provided a second computer program having the steps of making an inquiry to a user whether to record a program if a situation occurs in which the program becomes subject to recording if one of conditions providing criteria for selecting programs to be recorded is referenced, but does not become subject to recording if another of the conditions is referenced; selecting a program on the basis of a response by the user to the inquiry; and reflecting a selection result obtained by the selection step as a criterion by which to record a program if a similar overlapping status occurs later.

In the first information processing apparatus and method and computer program according to the invention, if a change occurs in the transmission time of a program set for timer-recording, this program overlaps, in transmission time, another program set for timer-recording. However, if a need occurs for recording programs in excess of the number of programs that may be simultaneously recorded, an inquiry is made to the user which of these programs is to be preferentially recorded. A response by the user to this inquiry is also used as a criteria for selecting a program to be preferentially recorded if a similar situation occurs later.

In the second information processing apparatus and method and computer program according to the invention, if a situation occurs in which the program becomes subject to recording if one of conditions providing criteria for selecting programs to be recorded is referenced, but does not become subject to recording if another of the conditions is referenced, an inquiry is made to the user whether to record that computer program. A program is selected on the basis of a response by the user to the inquiry. A selection result provides a criterion by which to record a program if a similar overlapping status occurs later.

As described above and according to embodiment of the present invention, if a situation occurs in which it becomes difficult to execute automatic processing without user intervention, an inquiry is made to the user to clear such a situation and a response made by the user to that inquiry will be used as a criterion by which to make a decision in a similar situation later.

BRIEF DESCRIPTION OF THE DRAWINGS

FIG. 8 is a flowchart indicative of deletion processing of the above-mentioned information processing apparatus.

DETAILED DESCRIPTION OF THE PREFERRED EMBODIMENTS

This invention will be described in further detail by way of embodiments thereof with reference to the accompanying drawings.

Figure 3:
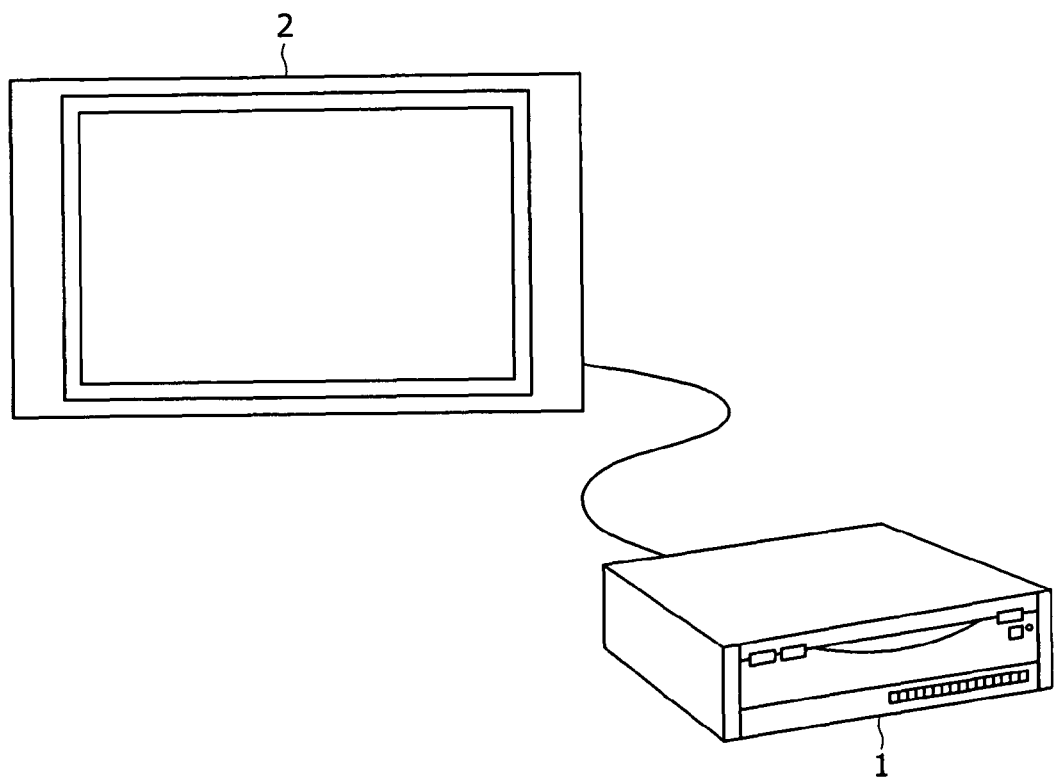
FIG. 3 is a schematic diagram illustrating an external view of an information processing apparatus practiced as one embodiment of the invention.

Now, referring to FIG. 3, there is an external view of an information processing apparatus 1 and a television receiver 2 (hereafter referred to as a TV 2) that is connected with the information processing apparatus 1 via a cable.

The information processing apparatus 1 has capabilities of automatically (without user intervention) selecting a predetermined one of broadcast programs and recording the selected broadcast program to an incorporated HDD. In the selection of each broadcast program to be recorded, the information processing apparatus 1 references user preference information generated on the basis of a user-selected keyword and a user operation log for example.

The information processing apparatus 1 also has capabilities of, if a broadcast program being aired is postponed for example to change the broadcast time of a broadcast program selected for recording, following the change (or changing the recording time) to record the affected broadcast program. When the change in broadcast time has been confirmed from the EPG, then the setting (or the recording time) of the timer-recording is changed to make the recording in accordance with the changed setting.

In the information processing apparatus 1, if the broadcast time of a broadcast program selected to be recorded and the broadcast time of another broadcast program selected for recording before a change in broadcast time overlap partially or totally, an inquiry to the user is made which of the broadcast programs to be preferentially broadcast in the overlapping time zone.

This inquiry is transmitted to the user by displaying a message to let the user preferentially select for recording one of the overlapping broadcast programs onto the TV 2 or by sending, by electronic mail, this message to user's mobile phone for example of which address has already been registered with the information processing apparatus 1.

Figure 1:
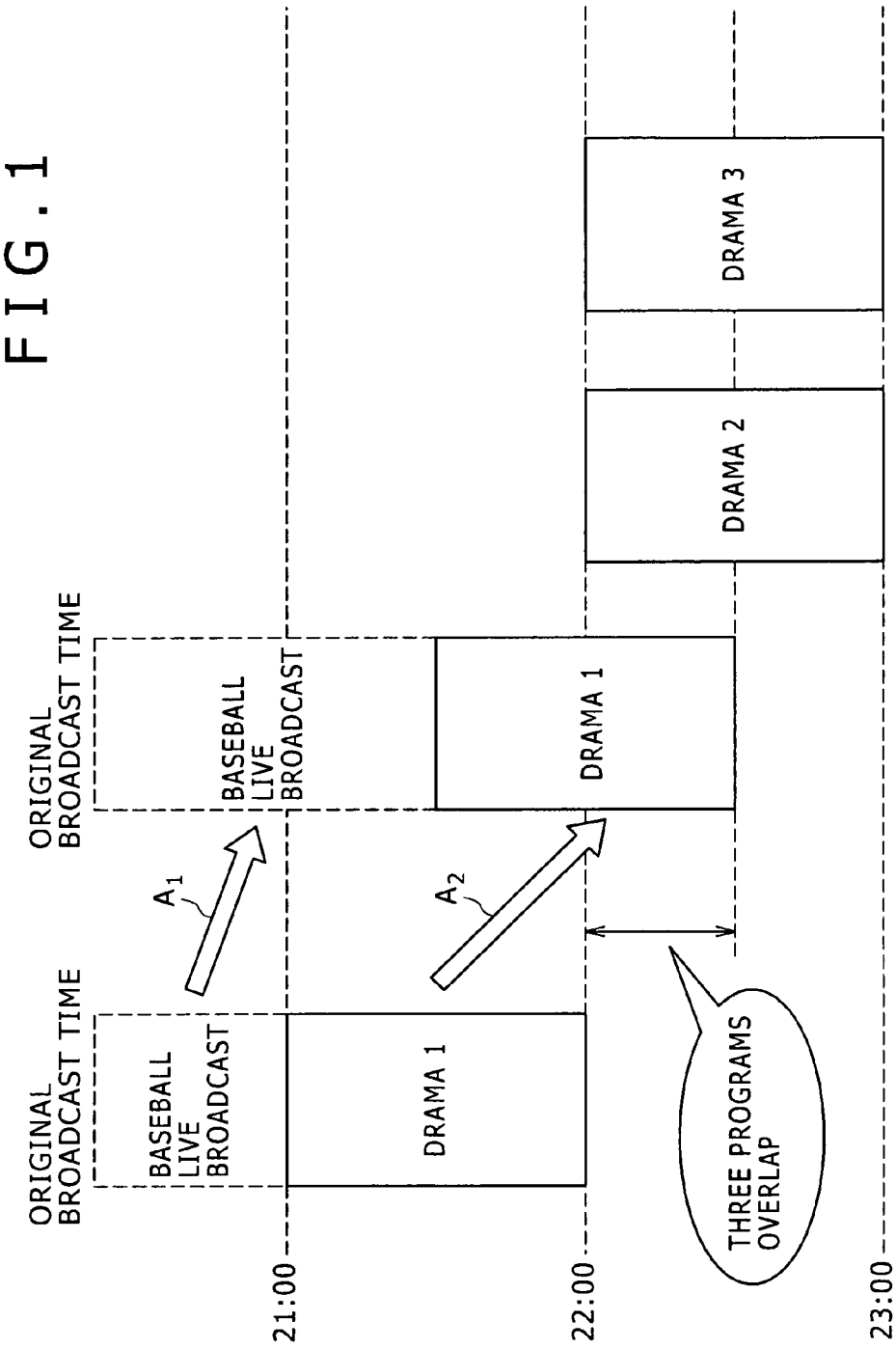
FIG. 1 is a schematic diagram illustrating an example in which a change has occurred in a broadcast time zone.

Therefore, if the information processing apparatus 1 has two tuners and it is necessary to record broadcast programs in excess of the number of tuners in a certain time zone as shown in FIG. 1 for example, an inquiry to the user is made which of these broadcast programs is to be preferentially recorded.

Consequently, if a situation not predicted by the information processing apparatus 1 occurs dynamically, such as the changing of broadcast times, the information processing apparatus 1 is able to select a broadcast program to be recorded on the basis of a response made by the user to each inquiry. If the information processing apparatus 1 itself selects a program to be recorded without making this inquiry, the program thus selected may contradict user's intention. The novel configuration described above prevents such a problem from occurring.

In addition, in the information processing apparatus 1, each response by the user to each inquiry is reflected as a criterion by which the selection of broadcast programs to be recorded in later similar situations is made.

For example, if the contents of the selection by the user in response to an inquiry made when the situation shown in FIG. 1 has occurred are the recording of drama 1 and drama 2 and the broadcast times of drama 1 and drama 2 overlap that of another broadcast program, this overlapping condition is reflected to user preference information that is the information providing the criterion by which broadcast programs to be recorded are selected.

Consequently, there is no need for making inquiry to the user every time a similar situation occurs, thereby mitigating the processing load of the information processing apparatus 1. In addition, the novel configuration prevents the user from being troubled by receiving inquiries every time a similar situation occurs.

As described above, the information processing apparatus 1 has the capabilities of automatically selecting broadcast programs to be recorded by referencing user preference information and recording the selected broadcast programs. For example, if a broadcast program that is subject to recording when program selection is made with attention paid on one condition (such as a program selection criterion) obtained from user preference information but not subject to recording when program selection is made with attention paid on another condition is detected from among broadcast programs subject to recording listed in an EGP, an inquiry is also made to the user.

For example, as described with reference to FIG. 2, if the performance of popular idol K in talk show "The Room of T" is found in an EPG with both condition A in which talk show "The Room of T" be not automatically recorded and condition B in which every broadcast program in which popular idol K performs be recorded are generated, then an inquiry is made whether or not to record this talk show "The Room of T". This inquiry is also made by displaying a message on the TV 2 or transmitting electronic mail.

If the user selects the recording of talk shown "The Room of T" in response to the inquiry, for example, "The Room of T" in which popular idol K performs is handled by the information processing apparatus 1 as a broadcast program subject to recording and will be recorded when the broadcasting thereof begins.

Consequently, if a contradiction occurs such as between one condition in which recording is not allowed and another in which recording is allowed, the information processing apparatus 1 is able to select a broadcast program to be recorded on the basis of a user response to each inquiry transmitted to the user. If the information processing apparatus 1 itself determines the recording or not without making an inquiry to the user, the determination may contradict the intention of the user. The novel configuration prevents such a problem from occurring.

In the above-mentioned example, the response by the user to each inquiry is reflected on the criterion by which to select programs to be recorded in later similar situations.

Figure 2:
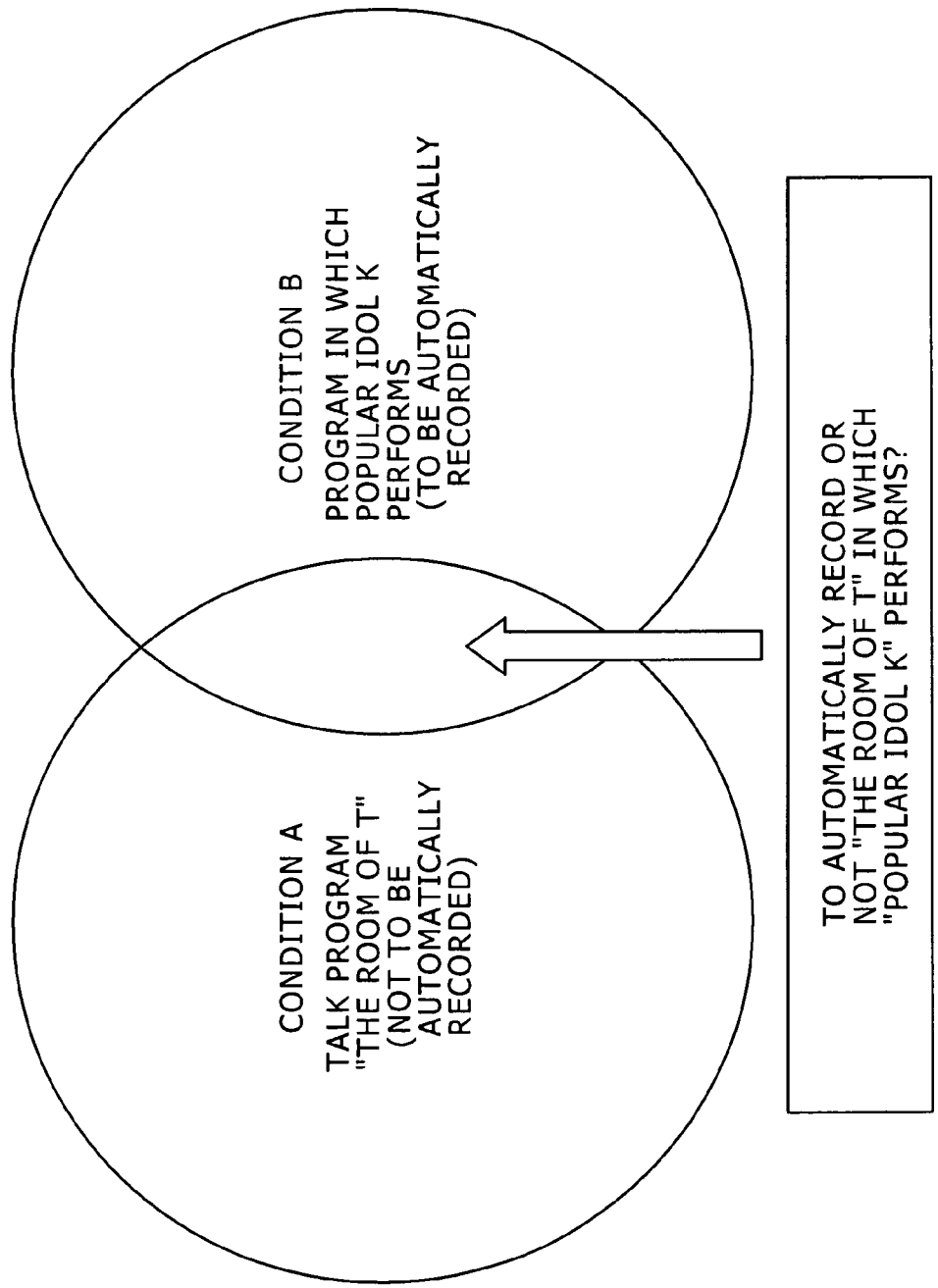
FIG. 2 is a schematic diagram illustrating an example in which a contradiction has occurred between conditions.

For example, if the selection by the user in response to an inquiry made in the situation shown in FIG. 2 is the recording of "The Room of T" in which popular idol K performs, this is reflected on user preference such that, if there is any broadcast program in which popular idol K performs but not subject to recording under other conditions, such a broadcast program is selected as subject to recording.

In this case, it is also unnecessary to make an inquiry to the user every time a similar situation occurs, thereby mitigating the processing load of the information processing apparatus 1 and preventing the user from being troubled by the reception of such an inquiry.

Further, in order to allocate a free space for recording broadcast programs, the information processing apparatus 1 has also capabilities of automatically deleting those broadcast programs which have passed a predetermined period since their recording on the HDD. If the information processing apparatus 1 cannot determine whether broadcast programs listed as candidates for deletion from the recorded broadcast programs are to be actually deleted, the information processing apparatus 1 makes an inquiry thereof to the user.

For example, if there is a broadcast program that has passed a certain period since its recording by the user himself by setting timer-recording (that is, not automatically selected and recorded by the information processing apparatus 1) and has not yet been reproduced for viewing, then an inquiry is made to the user whether this broadcast program is to be deleted or not. Normally, those broadcast programs that have passed a certain period since their recording are considered unnecessary for the user; however, those broadcast programs which were set by the user himself for timer-recording are normally considered necessary for the user, so that the information processing apparatus 1 cannot determine whether such broadcast programs are to be deleted or not, thereby making an inquiry thereof to the user.

If the information processing apparatus 1 itself determines deletion or not without making an inquiry thereof to the user, the determination may contradict the user intention. The novel configuration prevents this contradiction from occurring.

In this case also, the response by the user to each inquiry is reflected on the determination whether to delete or not a broadcast program in a later similar situation.

For example, if the response to the inquiry is that a broadcast program manually set by the user for timer-recording may be deleted, then this response will be reflected on the user preference such that those broadcast programs manually set for timer-recording will be deleted after passing of certain period since their recording.

In this case also, it becomes unnecessary to make an inquiry to the user every time a similar situation occurs, thereby mitigating the processing load of the information processing apparatus 1. This also prevents the user from being troubled by the reception of an inquiry every time a similar situation occurs.

The above-mentioned operation of the information processing apparatus 1 will be described later with reference to flowcharts.

Figure 4:
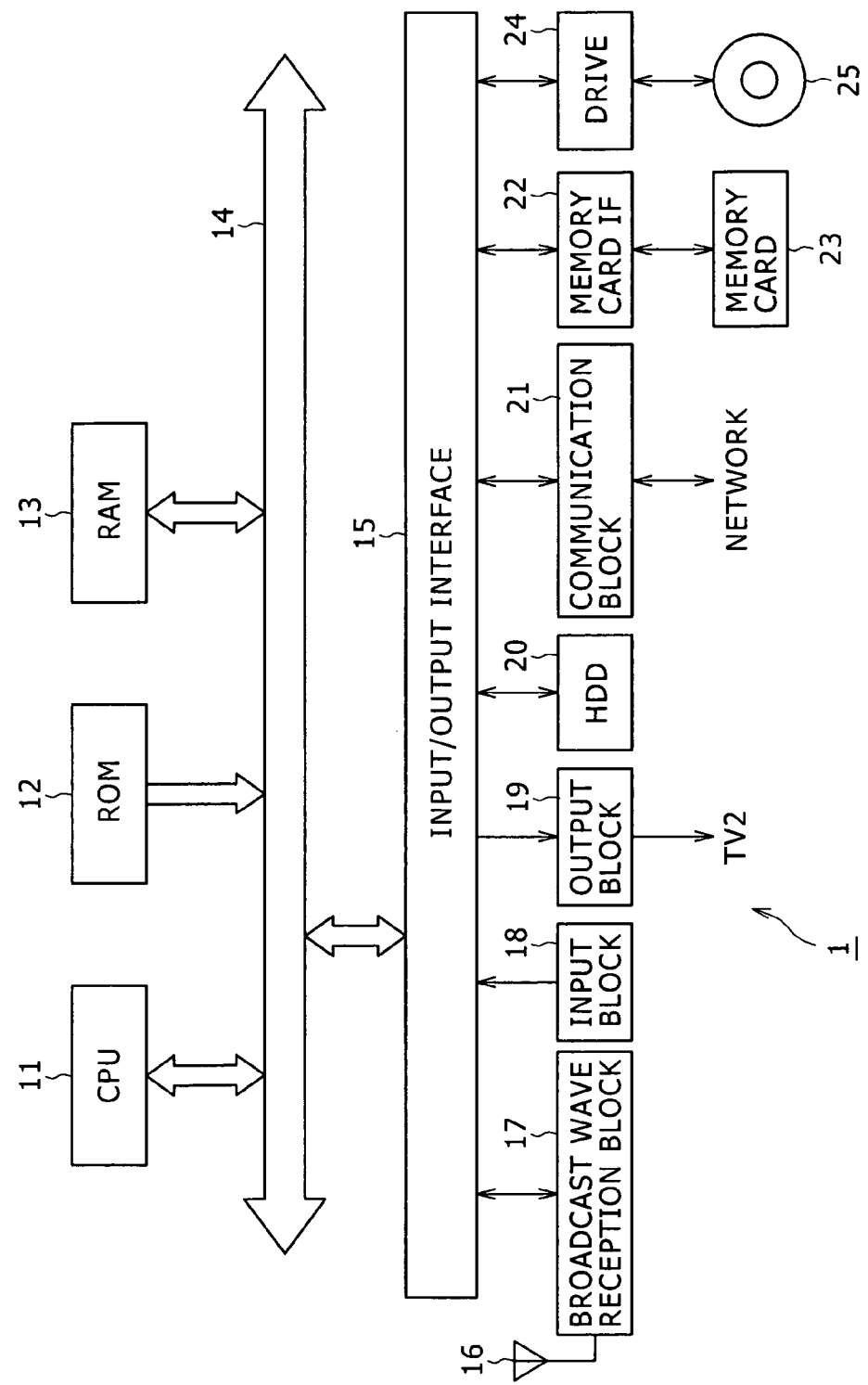
FIG. 4 is a block diagram illustrating an exemplary hardware configuration of the above-mentioned information processing apparatus.

Now, referring to FIG. 4, there is shown a block diagram illustrating an exemplary hardware configuration of the information processing apparatus 1 shown in FIG. 3.

A CPU (Central Processing Unit) 11 executes various kinds of processing as instructed by programs stored in a ROM (Read Only Memory) 12 and loaded from a HDD 20 into a RAM (Random Access Memory)13. The RAM 13 also stores, from time to time, data necessary for the CPU 11 to execute various kinds of processing.

The CPU 11, the ROM 12, and the RAM 13 are interconnected via a bus 14. The bus 14 is also connected with an input/output interface 15.

The input/output interface 15 is connected with a broadcast wave reception block 17, an input block 18, an output block 19, the HDD 20, a communication block 21, a memory card interface 22, and a drive 24.

The broadcast wave reception block 17 receives a signal transmitted from an antenna 16. Broadcast program data obtained from the signal received by the broadcast wave reception block 17 is compressed by the CPU 11 in MPEG (Moving Picture Experts Group) 2 for example to be stored in the HDD 20.

The input block 18 is made up of an infrared photo receiver for example. The input block 18 receives a signal from a remote controller, not shown, to output information indicative of an operation done by the user to the CPU 11.

The output block 19 decompresses a broadcast program stored in the HDD 20 and executes D/A conversion on the decompressed broadcast program, thereby displaying an image of the resultant broadcast program onto the TV 2. Also, the output block 19 sounds the audio data of the broadcast program from the TV 2.

The HDD 20 stores broadcast program data, the user preference data generated by the CPU 11, the timer-recording information indicative of the contents of timer-recording set by the user, and other various kinds of information.

The communication block 21 executes communication processing via a network to get EPGs by downloading them from a predetermined server for example.

The memory card interface 22 reads data from a memory card 23 loaded in a memory card slot and stores the read data into the HDD 20 for example.

The drive 24 drives an optical disc 25 loaded on the drive 24 to read data from the optical disc 25 and writes data thereto. The optical disc 25 is a CD (Compact Disc) or a DVD (Digital Versatile Disc) for example.

Figure 5:
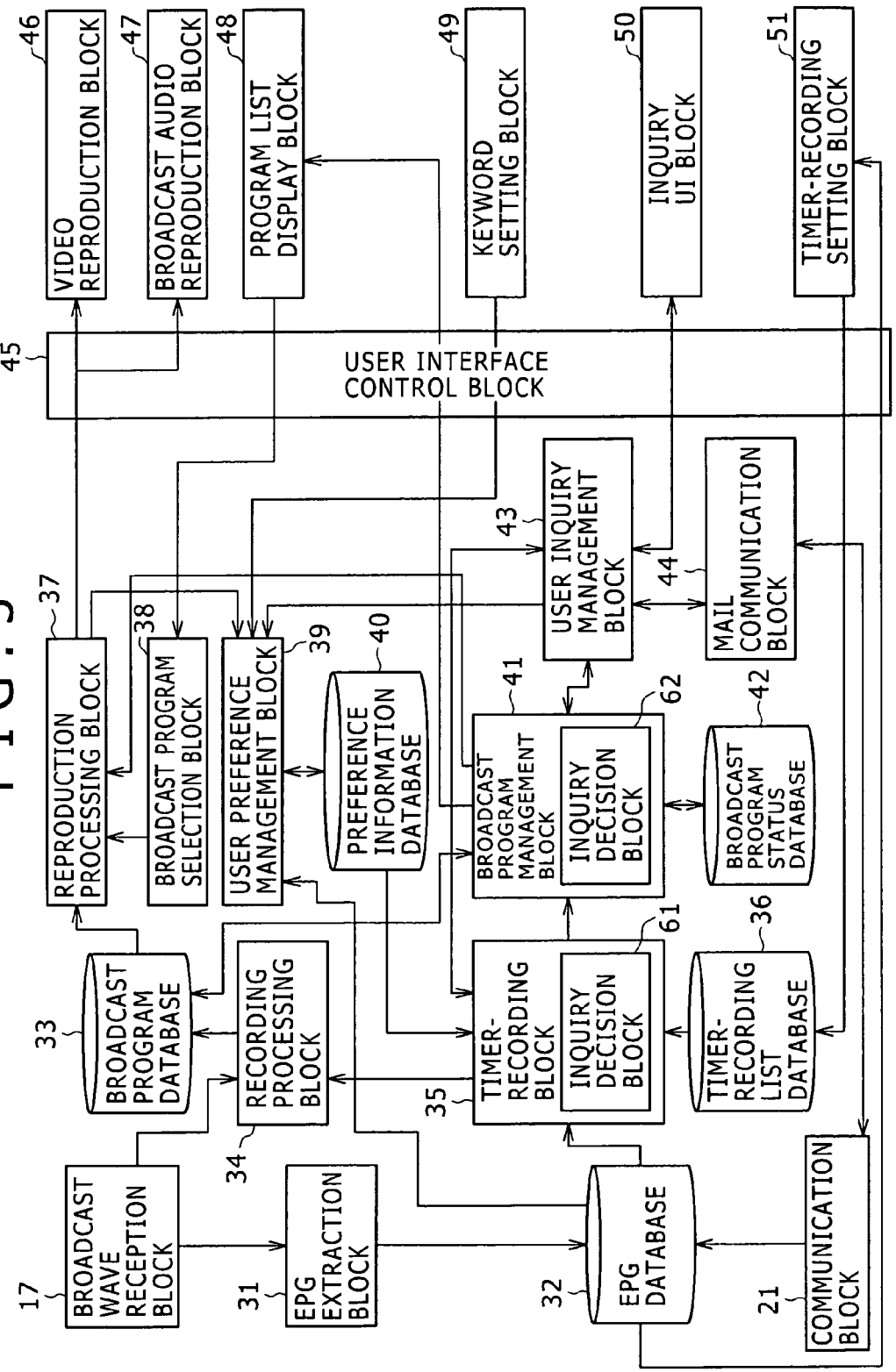
FIG. 5 is a block diagram illustrating an exemplary functional configuration of the above-mentioned information processing apparatus.

Referring to FIG. 5, there is shown a block diagram illustrating an exemplary functional configuration of the information processing apparatus 1. At least a part of the functional blocks shown in FIG. 5 is realized by executing predetermined computer programs by the CPU 11 shown in FIG. 4. With reference to FIG. 5, components similar to those previously described with reference to FIG. 4 are denoted the same reference numerals.

The broadcast wave reception block 17 receives a signal supplied from the antenna 16 to output the received signal to an EPG extraction block 31 and a recording processing block 34.

The communication block 21 accesses a predetermined server connected to the network and stores the downloaded EPG into an EPG database 32. Also, when electronic mail for inquiring the user for a broadcast program to be recorded comes from a mail communication block 44, the communication block 21 transmits electronic mail to a destination such as an address of a registered user mobile phone.

The EPG extraction block 31 extracts an EGP from the signal received from the broadcast wave reception block 17 and stores the extracted EPG into the EPG database 32.

The EPG database 32 stores the EPG received from. the EPG extraction block 31 or the communication block 21. The EPG stores titles, broadcast times, broadcast channels, performers, genres and other attribute information as related with the identification information of broadcast programs scheduled for broadcasting.

A broadcast program database 33 stores the data of broadcast programs supplied from the recording processing block 34.

As instructed by the timer-recording block 35, the recording processing block 34 gets, from a signal supplied from the broadcast wave reception block 17, the data of a broadcast program to be recorded, compresses the obtained data, and stores the compressed data into the broadcast program database 33.

Referencing the user preference information stored in a preference information database 40, the timer-recording block 35 selects, from among broadcast programs listed as broadcast programs to be broadcast in the EPG stored in the EPG database 32, those broadcast programs which match user preference and stores the timer-recording information including the broadcast times, broadcast channels, and broadcast program attribute information into the timer-recording list database 36. The setting of the timer-recording to be executed by the timer-recording block 35 on the basis of the preference information provides the setting of automatic timer-recording.

If the timer-recording information stored in a timer-recording list database 36 includes the information about a broadcast program to be recorded now, the timer-recording block 35 outputs the timer-recording information to the recording processing block 34, thereby making the recording processing block 34 record this broadcast program.

A timer-recording block 35 has an inquiry decision block 61. The inquiry decision block 61 references an EPG stored in the EPG database 32 at predetermined intervals to monitor whether there is any change in the broadcast time of a broadcast program scheduled for broadcasting. For example, if there is a change in the broadcast time of a broadcast program set for timer-recording and at least a part of the broadcast time after the change overlaps the broadcast time of another broadcast program set for timer-recording, thereby making it difficult to record all of these broadcast programs, then the inquiry decision block 61 decides that an inquiry to the user is necessary and instructs the user inquiry management block 43 to make an inquiry to the user.

In addition, the inquiry decision block 61 executes processing in response to a reply by the user to the above-mentioned inquiry, supplied from the user inquiry management block 43. For example, if the replay is indicative of the user selection made in response to an inquiry which of the broadcast programs overlapping in broadcast time is to be recorded, the inquiry decision block 61 accordingly changes the timer-recording information stored in the timer-recording list database 36.

The timer-recording list database 36 stores a list containing the timer-recording information about broadcast programs selected by the timer-recording block 35 and the timer-recording information supplied from a timer-recording setting block 51. As described above, the timer-recording information includes the broadcast time, broadcast channel, and other attribute information about each broadcast program to be recorded.

A reproduction processing block 37 reads image data of a broadcast program to be reproduced from a program database 33 in accordance with an instruction of a broadcast program selection block 38 or an instruction by a broadcast program management block 41 and outputs the read image data to a video reproduction block 46. Further, the reproduction processing block 37 reads audio data of the broadcast program from the program database 33 and outputs the audio data to an audio reproduction block 47.

The broadcast program selection block 38 makes the reproduction processing block 37 reproduce a broadcast program selected from a list of recorded broadcast programs (of which data are stored in the broadcast program database 33) displayed on the TV 2 by a broadcast program list display block 48.

A user preference management block 39 reads, from the EPG database 32, the attribute information such as the genre, title, and performer of the broadcast program reproduced by the reproduction processing block 37 and generates preference information indicative of user preference on the basis of the read attribute information and a user operation log for example. The preference information generated by the user preference management block 39 is stored in the preference information database 40 to be referenced, from time to time, as a criterion by which to select broadcast programs to be recorded.

In addition, the user preference management block 39 gets a keyword selected by the user from a list of keywords displayed on the TV 2 by a keyword setting block 49 and reflects the obtained keyword onto the preference information stored in the preference information database 40 such that the recording of broadcast programs including this keyword is executed preferentially.

Further, when notified of a response to an inquiry by a user inquiry management block 43, a user preference management block 39 reflects the received response onto the preference information stored in the preference information database 40. As described above, results of the selection by the user are reflected on the preference information such that, when one of broadcast programs has been selected from the broadcast programs overlapping in broadcast time due to changed broadcast times for example, the broadcast program selected in accordance with the inquiry or similar to the selected program (in genre, performer, and so on) preferentially becomes subject to recording.

The preference information database 40 stores the preference information received from the user preference management block 39. The preference information stored in the preference information database 40 is read by the timer-recording block 35 from time to time to be used as a criterion by which to select broadcast programs to be recorded.

The broadcast program management block 41 manages broadcast programs stored in the broadcast program database 33. For example, referencing the information stored in a broadcast program status database 42, the broadcast program management block 41 deletes the data of those broadcast programs which have passed a predetermined period of time since their recording, of the broadcast programs of which data are stored in the broadcast program database 33. The automatic deletion by the broadcast program management block 41 is executed in a predetermined timed relation, when the free space of the broadcast program database 33 has run short for example.

In addition, the broadcast program management block 41 makes the broadcast program list display block 48 display, on the TV 2, a list of broadcast programs of which data are stored in the broadcast program database 33. The information such as the titles of broadcast programs stored in the broadcast program database 33 is supplied from the broadcast program management block 41 to the broadcast program list display block 48.

The broadcast program management block 41 has an inquiry decision block 62. The inquiry decision block 62 determines that an inquiry to the user is necessary if a broadcast program selected as a candidate for automatic deletion is a broadcast program explicitly and manually set by the user for timer-recording and has not been reproduced for viewing and instructs the user inquiry management block 43 to make an inquiry whether to delete the selected broadcast program. When a response to the inquiry (indicative of whether or not to delete the broadcast program concerned) comes from the user inquiry management block 43, the inquiry decision block 62 accordingly manages the data of the broadcast program.

Further, if a broadcast program to be automatically deleted has now been selected by the user to be reproduced in accordance with an inquiry, the inquiry decision block 62 makes the reproduction processing block 37 reproduce that broadcast program. As will be described later, the user may select whether or not to delete a broadcast program that is a candidate for deletion or whether to view the broadcast program now or store it for one more week for example on a screen to be displayed by an inquiry UI block 50 onto the TV 2.

The broadcast program status database 42 stores status information indicative of the status of each broadcast program of which data is stored in the broadcast program database 33. The status information includes the information indicative whether the broadcast program concerned has already been viewed or not, the time passing since the recording thereof, whether or not the broadcast program concerned is locked against automatic deletion, and the period of storage thereof, for example.

When an instruction comes from the inquiry decision block 61 or the inquiry decision block 62, the user inquiry management block 43 controls inquiry UI block 50 to display the contents of the inquiry onto the TV 2 or controls the mail communication block 44 to transmit the contents of inquiry by electronic mail, thereby making an inquiry to the user.

Also, when a response to an inquiry is supplied from the inquiry UI block 50 or the mail communication block 44, the user inquiry management block 43 outputs the supplied response to the inquiry decision block 61 or the inquiry decision block 62. The user inquiry management block 43 also notifies the user preference management block 39 of the response to reflect it on the preference information.

The mail communication block 44 transmits electronic mail through the communication block 21 as instructed by the user inquiry management block 43.

A user interface control block 45 provides an interface between the user (namely the TV 2) and the information processing apparatus 1. As described above, transactions between the reproduction processing block 37 and a video reproduction block 46 and an audio reproduction block 47 and transactions between the broadcast program selection block 38 and the broadcast program list display block 48 are executed through this user interface control block 45.

The video reproduction block 46 displays the video (or the image) of a broadcast program on the basis of the data supplied from the reproduction processing block 37.

Likewise, the audio reproduction block 47 sounds the audio of broadcast program from the speaker of the TV 2 on the basis of the data supplied from the reproduction processing block 37.

On the basis of the data supplied from the broadcast program management block 41, the broadcast program list display block 48 displays, on the TV 2, a list of broadcast programs of which data are stored in the broadcast program database 33. Also, when a predetermined broadcast program is selected, from the displayed list, as a broadcast program to be reproduced, the broadcast program list display block 48 instructs the broadcast program selection block 38 to reproduce the selected broadcast program.

The keyword setting block 49 has beforehand various words such as words indicative of genres "sport", "drama", and "news", words indicative of names of celebrities, and words indicative of geographic names for example and displays a list of these words on the TV 2 to let the user select a word that provides a key for automatically selecting a broadcast program to be recorded. For example, if "drama" that is a word indicative of the genre of a broadcast program is selected, then the user preference management block 39 is notified thereof to reflect the selection on the preference information such that a "drama" broadcast program will be preferentially recorded.

In accordance with an instruction from the user inquiry management block 43, the inquiry UI block 50 displays a message on the TV 2 inquiring the user which of the broadcast programs overlapping in broadcast time is to be preferentially recorded, for example. Also, if a broadcast program to be preferentially recorded is selected by the user in response to an inquiry, the inquiry UI block 50 outputs the information indicative of the selection to the user inquiry management block 43.

On the basis of the data stored in the EPG database 32, the timer-recording setting block 51 displays an EPG on the TV 2 to let the user select a broadcast program to be recorded and displays on the TV 2 a setting screen having boxes in which the broadcast time (or recording time) and channel of each broadcast program to be set for timer-recording are entered. When these pieces of information are entered in these boxes, the timer-recording setting block 51 accepts the setting by the user for timer-recording. The timer-recording set to this setting screen provides the timer-recording explicitly manually executed by the user. The timer-recording information accepted by the timer-recording setting block 51 is supplied to the timer-recording list database 36 to be stored therein.

The following describes an operation of the information processing apparatus 1 having the above-mentioned configuration.

First, timer-recording management processing of the information processing apparatus 1 to be executed when the broadcast time of a broadcast program to be recorded is changed will be described with reference to the flowchart shown in FIG. 6.

In step S1, the inquiry decision block 61 of the timer-recording block 35 decides on the basis of an EPG stored in the EPG database 32 whether a change has occurred in the broadcast time of a broadcast program set for timer-recording.

If no change is found in step S1, the inquiry decision block 61 ends the processing. If a change is found, then the procedure goes to step S2.

In step S2, the inquiry decision block 61 decides whether there is any broadcast program that cannot be recorded because broadcast programs in excess of the number that can be simultaneously recorded overlap in broadcast time due to a change in broadcast time. For example, if the broadcast wave reception block 17 is cable of receiving the broadcast waves of two broadcast programs, the number of broadcast programs that the information processing apparatus 1 is capable of recording at the same time is two; therefore, if the broadcast times of more than two overlap, it is decided that there is at least one broadcast program that cannot be recorded.

If any broadcast program that cannot be recorded is not found in step S2, then the inquiry decision block 61 ends the processing. If such a broadcast program is found, the inquiry decision block 61 instructs the user inquiry management block 43 to make an inquiry to the user, upon which the procedure goes to step S3.

In step S3, the user inquiry management block 43 controls the inquiry UI block 50 to display on the TV 2 an inquiry which of the broadcast programs overlapping in broadcast time is to be recorded or control the mail communication block 44 to transmit such an inquiry to a mobile phone of the user by electronic mail, thereby making the inquiry to the user.

It should be noted that, if each broadcast program set for time-recording is prioritized, an inquiry to be made here may be made only when the priorities of broadcast programs overlapping in broadcast time are exactly or approximately the same. For example, if the priority of one of the broadcast programs overlapping in broadcast time is comparatively higher than that of another, then no user inquiry is made, the broadcast program having higher priority being preferentially recorded.

It is also practicable to make a decision when it is necessary for clear a situation in which the broadcast times of broadcast programs overlap and, in accordance with the degree of emergency of the clearance, one of the inquiries made by use of the TV 2 and the electronic mail may be selected. For example, if the timing of starting of broadcast time overlapping is near from the current time, it is decided that the status of the overlap must be cleared as soon as possible, an inquiry thereof being made by electronic mail for example.

It is also practicable to made a decision whether the user is watching the TV 2 and, if the user is found watching the TV 2, an inquiry is made by use of the TV 2; if the use is found not watching the TV 2, an inquiry is made by use of electronic mail. A decision whether the user is watching the TV 2 may be made by checking whether the information processing apparatus 1 is reproducing a recorded broadcast program or, if the information processing apparatus 1 and the TV 2 are cable of bidirectional communication with each other, may be made on the basis of the information supplied from the TV 2.

A response to such an inquiry (or a result thereof) is obtained by the user inquiry management block 43 via the inquiry UI block 50 or the mail communication block 44 to be outputted to the timer-recording block 35.

In step S4, in response to the inquiry result, the timer-recording block 35 determines a broadcast program to be recorded and changes the timer-recording information stored in the timer-recording list database 36. Consequently, among the broadcast programs overlapping in recording time, the recording of the broadcast program selected by the user is preferentially executed.

In step S5, the user inquiry management block 43 notifies the user preference management block 39 of the response from the user, thereby reflecting the received response on the preference information.

In the above-mentioned processing, if the broadcast time of drama 1 has been shifted to a time zone from 21:30 to 22:30 with timer-recording set to drama 1 of a broadcast time (original broadcast time) 21:00 to 22:30, and dramas 2 and 3 of a broadcast time 22:00 to 23:00 as described in FIG. 1 for example, the inquiry decision block 61 detects this shift and makes inquiry, by means of electronic mail for example, to the user which of dramas 1 through 3 is to be recorded in time zone 21:00 to 22:30.

If dramas 1 and 2 are selected in response to the inquiry for example, this selection by the user is reflected on the preference information such as dramas 1 and 2 are recorded preferentially before another broadcast program if a similar status, namely, a status in which the broadcast times of dramas 1 and 2 overlap the broadcast time of another broadcast program, occurs later.

Figure 7:
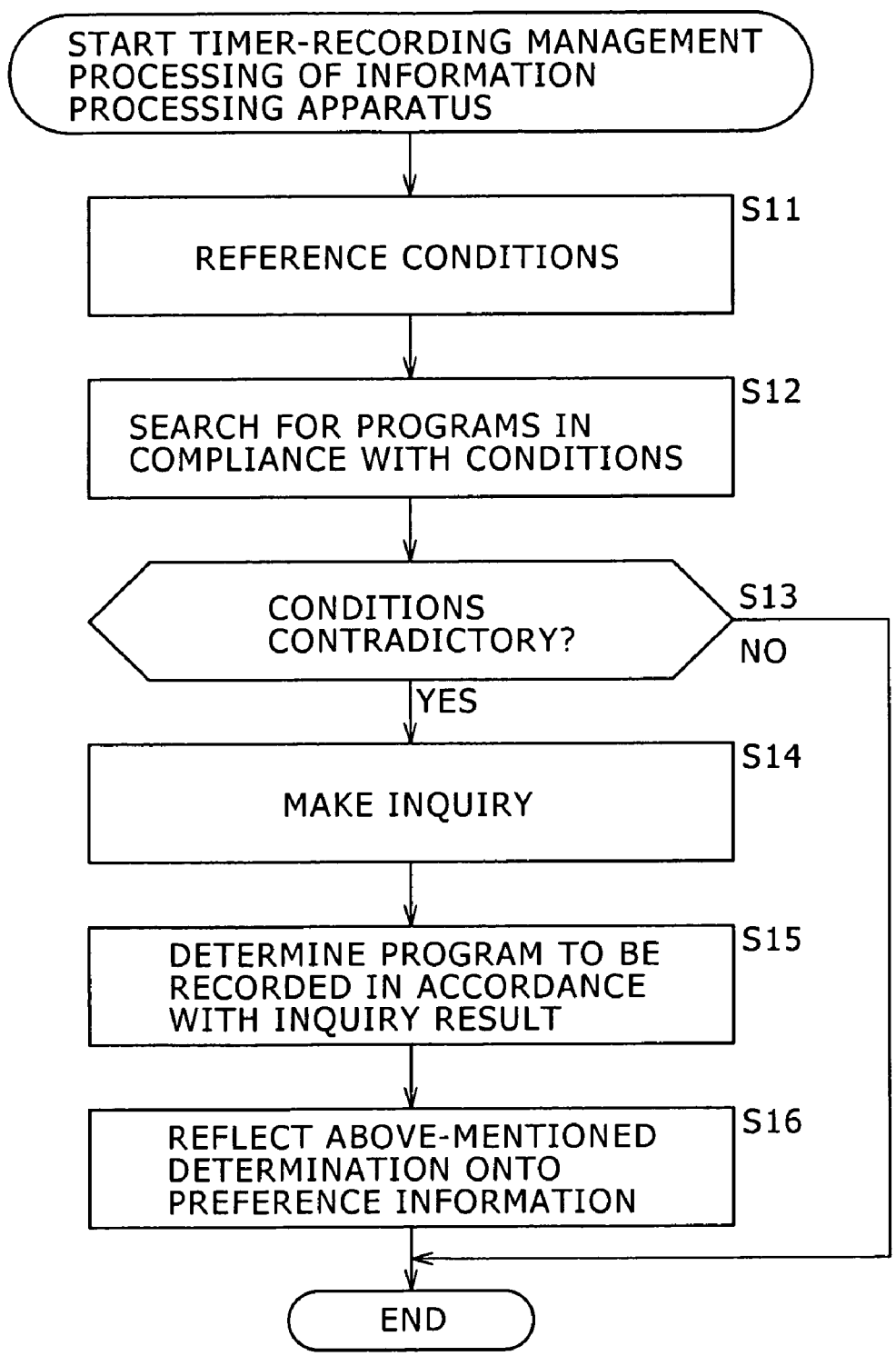
FIG. 7 is a flowchart indicative of another type of timer-recording management processing of the above-mentioned processing apparatus.

The following describes, with reference to the flowchart shown in FIG. 7, timer-recording management processing to be executed by the information processing apparatus 1 when there occurs a contradiction between conditions for selecting programs to be recorded.

In step S11, the inquiry decision block 61 gets a condition providing a program selection criterion from preference information stored in the preference information database 40 and references the obtained condition.

In step S12, the inquiry decision block 61 searches the broadcast programs listed as those to be recorded in an EPG stored in the EPG database 32 for a broadcast program that satisfies the above-mentioned condition.

In step S13, the inquiry decision block 61 decides, as a result of the search, whether the condition has a contradiction, or if there is any broadcast program that becomes subject to recording when a certain condition is applied but not when another condition is applied. If no such a broadcast program is found, the inquiry decision block 61 ends the processing.

On the other hand, if a broadcast program that becomes subject to recording when a certain condition is applied but not when another condition is applied is found in step S13, the inquiry decision block 61 instructs the user inquiry management block 43 to make an inquiry to the user, upon which the procedure goes to step S14.

Figure 6:
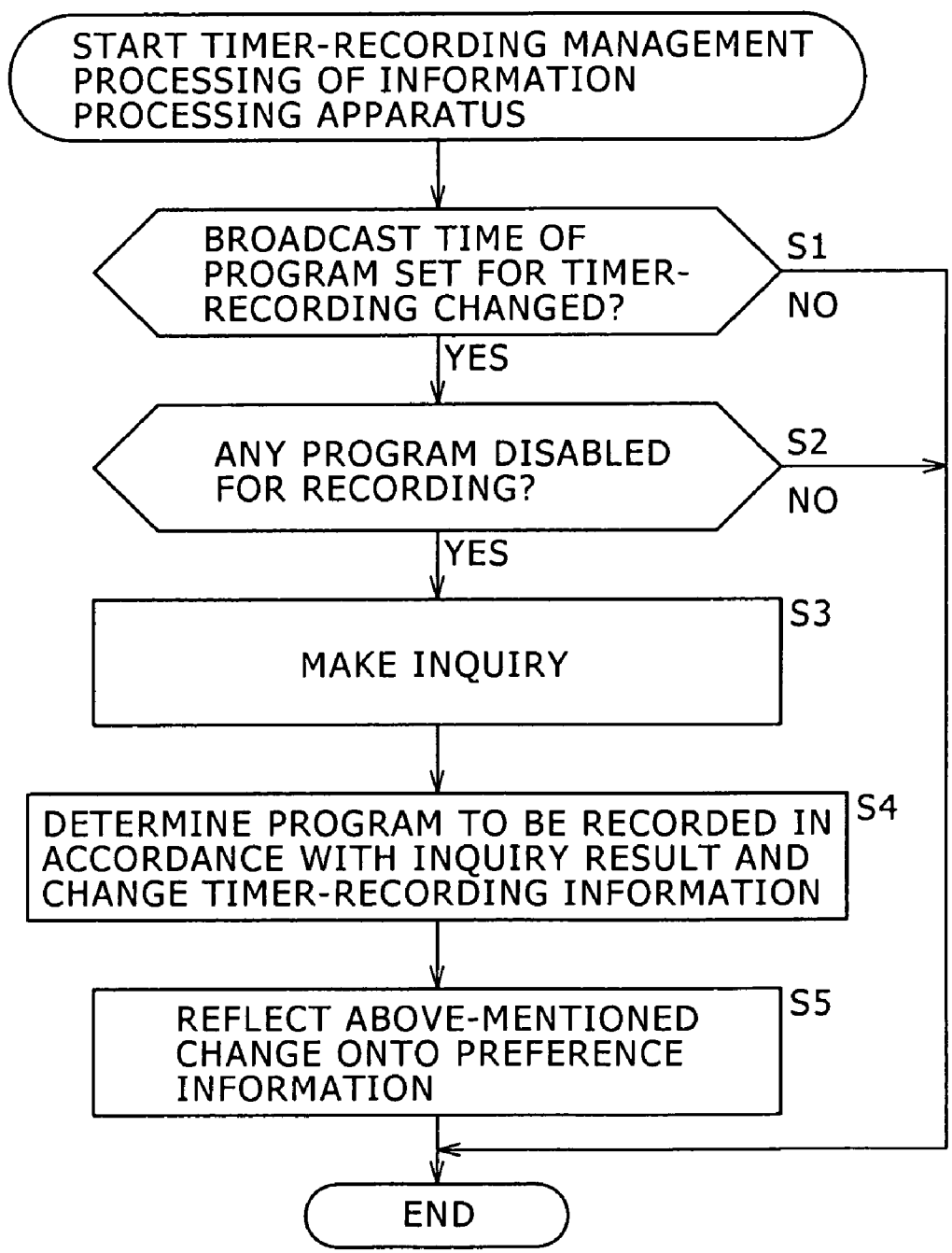
FIG. 6 is a flowchart indicative of timer-recording management processing of the above-mentioned information processing apparatus.

The processing operations in step S14 and on are basically the same as those of the processing operations of step S3 and on shown in FIG. 6. Namely, in step S14, the user inquiry management block 43 displays a message, on the TV 2, indicative whether or not to record a broadcast program that becomes subject to recording when a certain condition is applied but not when another condition is applied or transmits this message by electronic mail, thereby making an inquiry to the user.

It should be noted that, if conditions providing a broadcast program selection criterion are prioritized, the above-mentioned inquiry may be made only when the priorities of conditions are exactly or approximately the same. For example, if the priority of one condition is comparatively higher than that of another, then no inquiry is made and recording or not recording is determined in accordance with the condition of higher priority.

The response by the user to the above-mentioned inquiry is obtained by the user inquiry management block 43 via the inquiry UI block 50 or the mail communication block 44 to be outputted to the timer-recording block 35 as a result of the inquiry.

In step S15, the timer-recording block 35 determines in accordance with the result of the inquiry whether or not to record the broadcast program having a contradictory condition and accordingly stores the timer-recording information in the timer-recording list database 36 from time to time. Consequently, if the recording is selected by the user, a broadcast program having a contradictory condition is recorded.

In step S16, the user inquiry management block 43 notifies the user preference management block 39 of the result of the selection by the user, which is reflected on the preference information.

By the above-mentioned processing, as described with reference to FIG. 2, if an EPG indicates that popular idol K will perform in talk show "The Room of T" with condition A in which talk show "The Room of T" be not automatically subject to recording and condition B in which any programs in which popular idol K performs be automatically recorded obtained from the preference information, then this situation is detected by the inquiry decision block 61 and an inquiry whether or not record this broadcast program is recorded is made by means of electronic mail for example.

If the recording is selected in response to the inquiry, for example, this selection is reflected on the preference information such that, if a similar situation occurs, namely, if a situation in which a broadcast program in which popular idol K performs also corresponds to a broadcast program not to be recorded in other conditions occurs, that program is recorded.

The following describes the processing by the information processing apparatus 1 for deleting the data of recorded broadcast programs, with reference to the flowchart shown in FIG. 8.

In step S21, the broadcast program management block 41 determines whether the free space of the broadcast program database 33 is running short. If the free space is fount not running short, then the processing ends. For example, if there is a free space in excess of a predetermined level, it is determined that the free space is not running short.

On the other hand, if the broadcast program management block 41 determines that the free space of the broadcast program database 33 is running short in step S21, then the procedure goes to step S22. In step S22, the broadcast program management block 41 references status information stored in the broadcast program status database 42 to select, from among the broadcast programs of which data are stored in the broadcast program status database 42, broadcast programs which have passed a predetermined time since the recording thereof as candidates for automatic deletion.

In step S23, the inquiry decision block 62 determines whether the broadcast programs selected as candidates for automatic deletion include any broadcast programs that were recorded in accordance with the timer-recording manually set by the user and have not yet been reproduced for viewing. If no such a broadcast program is found, the processing ends.

If the broadcast programs selected as candidates for automatic deletion include any broadcast programs that were recorded in accordance with the timer-recording manually set by the user and have not yet been reproduced for viewing, then the inquiry decision block 62 instructs the user inquiry management block 43 to make an inquiry to the user, upon which the procedure goes to step S24.

The processing operations in step S24 are basically the same as those in step S3 shown in FIG. 6. Namely, in step S24, the user inquiry management block 43 makes an inquiry to the user by displaying a message on the TV 2 or transmitting the message by means of electronic mail to the user, thereby letting the user select how to handle those broadcast programs recorded by the timer-recording manually set by the user and not yet reproduced for viewing included in the broadcast programs selected as candidates for automatic deletion.

The response by the user to the inquiry is obtained by the user inquiry management block 43 via the inquiry UI block 50 or the mail communication block 44 to be outputted to the broadcast program management block 41 as a result of the inquiry.

In step S25, the broadcast program management block 41 executes processing in accordance with the result of the inquiry. For example, if the deletion of a broadcast program is selected, the broadcast program management block 41 deletes the specified broadcast program from the broadcast program database 33. If the user selects not to delete a broadcast program, then the broadcast program management block 41 keeps storing the corresponding data in the broadcast program database 33. In addition, if the user selects to view a broadcast program right now, the broadcast program management block 41 notifies the reproduction processing block 37 thereof, thereby reproducing the broadcast program selected an candidate for automatic deletion.

In step S26, the user inquiry management block 43 notifies the user preference management block 39 of the result of the selection by the user, which is reflected on the preference information.

Thus, if the inquiry decision block 62 detects that the broadcast programs selected as candidates for automatic deletion include those broadcast programs which where recorded in accordance with the timer-recording manually set by the user and have not yet been reproduced for viewing, then a popup message such as "This program will soon be deleted! Select one: "Reproduce now", "Store one more week", "Lock", "Not reproduce in the future" is displayed on the TV 2, for example, thereby letting the user select what the user desires.

For example, if "Reproduce now" is selected, the reproduction processing block 37 reproduces the specified broadcast program as described above. At this moment, the status information stored in the broadcast program status database 42 is updated by the broadcast program management block 41, changing program status from "Not reproduced" to "Reproduced".

If "Store one more week" is selected, storage period is selected by the broadcast program management block 41 as status information stored in the broadcast program status database 42 and the specified broadcast program is handled as not subject to automatic deletion until that storage period.

If "Lock" is selected, the prohibition of deletion is set by the broadcast program management block 41 as status information stored in the broadcast program status database 42 and the specified broadcast program is handled as not subject to automatic deletion until it is unlocked.

If "Not reproduce in the future" is selected, the data stored in the broadcast program database 33 is deleted.

The selection by the user is reflected on the preference information. For example, if "Lock" is selected, a broadcast program recorded in accordance with timer-recording manually set by the user and not reproduced for viewing is excluded from the broadcast programs subject to automatic deletion when such a broadcast program is selected as a candidate for automatic deletion.

In the above-mentioned novel configuration, the apparatus for making an inquiry to the user as required is arranged as the information processing apparatus 1 that is separated from the TV 2. It is also practicable to incorporate such an apparatus in the TV 2.

In the above-mentioned novel configuration, each inquiry to the user is made when there are a broadcast times overlap or a contraction occurs in recording conditions. It is also practicable to make each inquiry to the user when any situations occurs as long as the possibility of contracting user intention is comparatively high when the information processing apparatus 1 itself decides by itself.

The above-mentioned sequence of processing operations may be executed by software as well as hardware.

When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

As shown in FIG. 4, separated from the apparatus main, this recording medium is configured by not only an optical disc 25 to be distributed for providing computer programs to users but also the ROM 12 and the HDD 20 recorded with computer programs, provided to users as assembled in the apparatus main.

It should be noted herein that the steps for describing each program recorded in recording media include not only the processing operations which are sequentially executed in a time-dependent manner but also the processing operations which are executed concurrently or discretely.

While preferred embodiments of the present invention have been described using specific terms, such description is for illustrative purpose only, and it is to be understood that changes and variations may be made without departing from the spirit or scope of the following claims.

What is claimed is:

1. An information processing apparatus capable of selecting a program to be recorded, comprising:
   an inquiry decision block for determining whether inquiring a user is necessary based on a comparison of priorities among programs to be recorded when a total number of the programs exceeds a predetermined number and transmission times of the programs overlap;
   an inquiry block for inquiring the user which of the programs overlapping in transmission time is to be recorded when an inquiry is determined to be necessary, the inquiry block determining an inquiring method according to whether the user is watching a TV apparatus;
   a selection block for selecting a program on the basis of a response by said user to said inquiry; and
   a reflection block for reflecting a selection result obtained by said selection block as a criterion by which to record a program if a similar overlapping status occurs later,
   wherein the inquiry block determines whether to use an electronic mail to inquiry the user based on an interval between a starting time of an overlapping program and a current time,
   wherein the reflection block reflects the selection result based on a preference of the user over a character in the program,
   wherein the inquire decision block determines to inquire the user when a program becomes subject to recording under a first condition and is not allowed to be recorded under a second condition, and
   wherein the inquiry decision block references an electronic program guide at predetermined intervals to monitor whether a broadcast time of a broadcast program is changed.

2. The information processing apparatus according to claim 1, wherein said inquiry block makes an inquiry to the user which program is to be recorded, by use of one of methods of displaying the inquiry on a display monitor and transmitting the inquiry by electronic mail.

3. The information processing apparatus according to claim 2, wherein said inquiry block selects one of said methods of displaying the inquiry on a display monitor and transmitting the inquiry by electronic mail in accordance with a degree of emergency for clearing said status in which transmission times of programs exceeding the number of programs that may be simultaneously recorded.

4. An information processing method for an information processing apparatus capable of selecting a program to be recorded, comprising the steps of:
   determining whether inquiring a user is necessary based on a comparison of priorities among programs to be recorded when a total number of the programs exceeds a predetermined number and transmission times of the programs overlap;
   inquiring the user which of the programs overlapping in transmission time is to be recorded when an inquiry is determined to be necessary, the inquiry step determining an inquiring method according to whether the user is watching a TV apparatus;
   selecting a program on the basis of a response by said user to said inquiry; and
   reflecting a selection result obtained by said selection step as a criterion by which to record a program if a similar status occurs later,
   wherein the inquiry step determines whether to use an electronic mail to inquiry the user based on an interval between a starting time of an overlapping program and a current time,
   wherein the reflection step reflects the selection result based on a preference of the user over a character in the program,
   wherein the determining step determines to inquire the user when a program becomes subject to recording under a first condition and is not allowed to be recorded under a second condition, and
   wherein the determining step references an electronic program guide at predetermined intervals to monitor whether a broadcast time of a broadcast program is changed.

5. A non-transitory computer readable medium encoded with a computer program for making a computer execute processing of selecting a program to be recorded, the computer program comprising the steps of:
   determining whether inquiring a user is necessary based on a comparison of priorities among programs to be recorded when a total number of the programs exceeds a predetermined number and transmission times of the programs overlap;

inquiring the user which of the programs overlapping in transmission time is to be recorded when an inquiry is determined to be necessary, the inquiry step determining an inquiring method according to whether the user is watching a TV apparatus;

selecting a program on the basis of a response by said user to said inquiry; and reflecting a selection result obtained by said selection step as a criterion by which to record a program if a similar status occurs later, wherein the inquiry step determines whether to use an electronic mail to inquiry the user based on an interval between a starting time of an overlapping program and a current time, wherein the reflection step reflects the selection result based on a preference of the user over a character in the program, wherein the determining step determines to inquire the user when a program becomes subject to recording under a first condition and is not allowed to be recorded under a second condition, and wherein the determining step references an electronic program guide at predetermined intervals to monitor whether a broadcast time of a broadcast program is changed.

* * * * *